(12) United States Patent
Fowler et al.

(10) Patent No.: US 10,675,615 B2
(45) Date of Patent: Jun. 9, 2020

(54) HIGH CAPACITY STRUCTURES AND MONOLITHS VIA PASTE IMPRINTING

(71) Applicants: Tracy A. Fowler, Magnolia, TX (US);
Thomas M. Smith, Iselin, NJ (US);
Joshua I. Cutler, Houston, TX (US);
Jenna L. Walp, Bethlehem, PA (US)

(72) Inventors: Tracy A. Fowler, Magnolia, TX (US);
Thomas M. Smith, Iselin, NJ (US);
Joshua I. Cutler, Houston, TX (US);
Jenna L. Walp, Bethlehem, PA (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 16/397,573

(22) Filed: Apr. 29, 2019

(65) Prior Publication Data
US 2019/0255521 A1     Aug. 22, 2019

Related U.S. Application Data

(62) Division of application No. 14/880,557, filed on Oct. 12, 2015, now Pat. No. 10,307,749.
(Continued)

(51) Int. Cl.
*B01J 35/04* (2006.01)
*B01J 29/06* (2006.01)
(Continued)

(52) U.S. Cl.
CPC ............... *B01J 35/04* (2013.01); *B01J 29/06* (2013.01); *B01J 37/0244* (2013.01); *B32B 3/12* (2013.01);
(Continued)

(58) Field of Classification Search
None
See application file for complete search history.

(56) References Cited

U.S. PATENT DOCUMENTS 1,868,138 A    7/1932 Fisk
3,103,425 A    9/1963 Meyer
(Continued)

FOREIGN PATENT DOCUMENTS

EP    0257493    2/1988
EP    0426937    5/1991
(Continued)

OTHER PUBLICATIONS

U.S. Appl. No. 16/252,975, filed Jan. 21, 2019, Krishna Nagavarapu et al.
(Continued)

*Primary Examiner* — Peter A Salamon
(74) *Attorney, Agent, or Firm* — ExxonMobil Upstream Research Company, Law Department

(57) ABSTRACT

The disclosure relate generally to structures, forms, and monoliths, and methods of preparing the same. This disclosure can produce uniform structured passageways or channels of active material, including adsorbent or catalyst, by imprinting or molding features into a paste on a support that can be subsequently assembled into a gas or liquid treating structure, i.e. a monolith. The paste, which can include an active material, binder, and other potential additives, can be applied to the support or pushed through a support (as in a mesh) as a thin film. The paste can be imprinted, stamped, shaped or otherwise handled to give features of desired height, shape, width, and positioning. When stacked or rolled, the features of one layer contact a subsequent layer, which seal to form passageways. The resulting structure can
(Continued)

have high cell-density (>1000 cells per square inch) and a large volume fraction of active material.

20 Claims, 7 Drawing Sheets

Related U.S. Application Data

(60) Provisional application No. 62/077,977, filed on Nov. 11, 2014.

(51) Int. Cl.
  *B32B 3/30* (2006.01)
  *B32B 3/12* (2006.01)
  *B32B 37/00* (2006.01)
  *B32B 38/00* (2006.01)
  *B01J 37/02* (2006.01)
  *C04B 28/24* (2006.01)
  *C04B 38/00* (2006.01)
  *C04B 111/00* (2006.01)

(52) U.S. Cl.
  CPC ...... *B32B 37/0076* (2013.01); *B32B 38/0012* (2013.01); *C04B 28/24* (2013.01); *C04B 38/008* (2013.01); *B32B 2255/06* (2013.01); *B32B 2255/20* (2013.01); *B32B 2311/00* (2013.01); *C04B 2111/0081* (2013.01); *C04B 2111/00612* (2013.01); *C04B 2111/00637* (2013.01)

(56) References Cited

U.S. PATENT DOCUMENTS

| | | |
|---|---|---|
| 3,124,152 A | 3/1964 | Payne |
| 3,142,547 A | 7/1964 | Marsh et al. |
| 3,508,758 A | 4/1970 | Strub |
| 3,594,983 A | 7/1971 | Yearout |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A | 6/1983 | Mizuno et al. |
| 4,421,531 A | 12/1983 | Dalton, Jr. et al. |
| 4,445,441 A | 5/1984 | Tanca |
| 4,461,630 A | 7/1984 | Cassidy et al. |
| 4,496,376 A | 1/1985 | Hradek |
| 4,631,073 A | 12/1986 | Null et al. |
| 4,693,730 A | 9/1987 | Miller et al. |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,547,641 A | 8/1996 | Smith et al. |
| 5,565,018 A | 10/1996 | Baksh et al. |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,779,768 A | 7/1998 | Anand et al. |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,827,577 A | 10/1998 | Spencer |
| 5,882,380 A | 3/1999 | Sircar |
| 5,906,673 A | 5/1999 | Reinhold, III et al. |
| 5,908,480 A | 6/1999 | Ban et al. |
| 5,912,426 A | 6/1999 | Smolarek et al. |
| 5,914,294 A | 6/1999 | Park et al. |
| 5,924,307 A | 7/1999 | Nenov |
| 5,935,444 A | 8/1999 | Johnson et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,102,985 A | 8/2000 | Naheiri et al. |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |
| 6,444,610 B1 | 9/2002 | Yamamoto |
| 6,451,095 B1 | 9/2002 | Keefer et al. |
| 6,457,485 B2 | 10/2002 | Hill et al. |
| 6,458,187 B1 | 10/2002 | Fritz et al. |
| 6,464,761 B1 | 10/2002 | Bugli |
| 6,471,749 B1 | 10/2002 | Kawai et al. |
| 6,471,939 B1 | 10/2002 | Boix et al. |
| 6,488,747 B1 | 12/2002 | Keefer et al. |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |

(56) References Cited

U.S. PATENT DOCUMENTS

| | | |
|---|---|---|
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,243,679 B2 | 7/2007 | Thelen |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,449,649 B2 | 5/2013 | Greenough |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,753,428 B2 | 6/2014 | Lomax, Jr. et al. |

(56) References Cited

U.S. PATENT DOCUMENTS

| | | |
|---|---|---|
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,790,618 B2 | 7/2014 | Adams et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,067,169 B2 | 6/2015 | Patel |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,483 B2 | 10/2015 | Ravikovitch et al. |
| 9,168,485 B2 | 10/2015 | Deckman et al. |
| 9,272,264 B2 | 3/2016 | Coupland |
| 9,278,338 B2 | 3/2016 | Coupland |
| 9,358,493 B2 | 6/2016 | Tammera et al. |
| 9,573,116 B2 | 2/2017 | Johnson et al. |
| 9,597,655 B2 | 3/2017 | Beeckman |
| 9,737,846 B2 | 8/2017 | Carstensen et al. |
| 9,744,521 B2 | 8/2017 | Brody et al. |
| 10,040,022 B2 | 8/2018 | Fowler et al. |
| 10,080,991 B2 | 9/2018 | Johnson et al. |
| 10,080,992 B2 | 9/2018 | Nagavarapu et al. |
| 10,124,286 B2 | 11/2018 | McMahon et al. |
| 2001/0047824 A1 | 12/2001 | Hill et al. |
| 2002/0053547 A1 | 5/2002 | Schlegel et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0145726 A1 | 8/2003 | Gueret et al. |
| 2003/0170527 A1 | 9/2003 | Finn et al. |
| 2003/0188635 A1 | 10/2003 | Lomax, Jr. et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118277 A1 | 6/2004 | Kim |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0045041 A1 | 3/2005 | Hechinger et al. |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0017940 A1 | 1/2006 | Takayama |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0116430 A1 | 6/2006 | Wentink et al. |
| 2006/0116460 A1 | 6/2006 | Georget et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0202336 A1 | 8/2008 | Hofer et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0025555 A1 | 1/2009 | Lively et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0294366 A1 | 12/2009 | Wright et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0011803 A1 | 1/2011 | Koros |
| 2011/0020202 A1 | 1/2011 | Gadkaree et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0123878 A1 | 5/2011 | Jangbarwala |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024150 A1 | 2/2012 | Moniot |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0272823 A1 | 11/2012 | Halder et al. |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0095996 A1 | 4/2013 | Buelow et al. |

(56) References Cited

U.S. PATENT DOCUMENTS

| | | |
|---|---|---|
| 2013/0225898 A1 | 8/2013 | Sundaram et al. |
| 2014/0013955 A1 | 1/2014 | Tammera et al. |
| 2014/0060326 A1 | 3/2014 | Sundaram et al. |
| 2014/0157984 A1 | 6/2014 | Deckman et al. |
| 2014/0157986 A1 | 6/2014 | Ravikovitch et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |
| 2015/0101483 A1 | 4/2015 | Perry et al. |
| 2015/0196870 A1 | 7/2015 | Albright et al. |
| 2015/0328578 A1 | 11/2015 | Deckman et al. |
| 2016/0023155 A1 | 1/2016 | Ramkumar et al. |
| 2016/0129433 A1 | 5/2016 | Tammera et al. |
| 2016/0166972 A1 | 6/2016 | Owens et al. |
| 2016/0236135 A1 | 8/2016 | Tammera et al. |
| 2016/0332105 A1 | 11/2016 | Tammera et al. |
| 2016/0332106 A1 | 11/2016 | Tammera et al. |
| 2017/0056814 A1 | 3/2017 | Marshall et al. |
| 2017/0113173 A1 | 4/2017 | Fowler et al. |
| 2017/0113175 A1 | 4/2017 | Fowler et al. |
| 2017/0136405 A1 | 5/2017 | Ravikovitch et al. |
| 2017/0266604 A1 | 9/2017 | Tammera et al. |
| 2017/0282114 A1 | 10/2017 | Owens et al. |
| 2017/0341011 A1 | 11/2017 | Nagavarapu et al. |
| 2017/0341012 A1 | 11/2017 | Nagavarapu et al. |
| 2018/0001301 A1 | 1/2018 | Brody et al. |
| 2018/0056229 A1 | 3/2018 | Denton et al. |
| 2018/0056235 A1 | 3/2018 | Wang et al. |
| 2018/0169565 A1 | 6/2018 | Brody et al. |
| 2018/0169617 A1 | 6/2018 | Brody et al. |
| 2018/0339263 A1 | 11/2018 | Dehaas et al. |

FOREIGN PATENT DOCUMENTS

| | | |
|---|---|---|
| EP | 0904827 | 3/1999 |
| EP | 1674555 | 6/2006 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 06006736 | 6/1992 |
| JP | H6-6736 U | 1/1994 |
| JP | 3477280 | 8/1995 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| JP | 2013-244469 A | 12/2013 |
| KR | 101349424 | 1/2014 |
| WO | WO2002/024309 | 3/2002 |
| WO | WO2002/073728 | 9/2002 |
| WO | WO 03/004438 A2 | 1/2003 |
| WO | WO2005/090793 | 9/2005 |
| WO | WO2010/024643 | 3/2010 |
| WO | WO2011/139894 | 11/2011 |

OTHER PUBLICATIONS

U.S. Appl. No. 16/258,266, filed Jan. 25, 2019, Barnes et al.
U.S. Appl. No. 16/263,940, filed Jan. 31, 2019, Johnson.
U.S. Appl. No. 62/783,766, filed Dec. 21, 2019, Fulton et al.
Allen, M. P. et al., (1987) "Computer Simulation of Liquids" Clarendon Press, pp. 156-160.
Asgari, M. et al., (2014) "Designing a Commercial Scale Pressure Swing Adsorber for Hydrogen Purification" *Petroleum & Coal*, vol. 56(5), pp. 552-561.

Baerlocher, C. et al., (2017) International Zeolite Association's "Database of Zeolite Structures," available at http://www.iza-structure.org/databases/, downloaded Jun. 15, 2018, 1 page.
Burtch, N.C. et al., (2015) "Molecular-level Insight into Unusual Low Pressure CO2 Affinity in Pillared Metal-Organic Frameworks," *J Am Chem Soc*, 135, pp. 7172-7180.
Beauvais, C. et al., (2004) "Distribution of Sodium Cations in Faujasite-Type Zeolite: A Canonical Parallel Tempering Simulation Study," *J Phys Chem B*, 108, pp. 399-404.
Cheung, O. et al., (2013) "Adsorption kinetics for CO2 on highly selective zeolites NaKA and nano-NaKA," *Appl Energ*, 112, pp. 1326-1336.
Cygan, R. T. et al., (2004) "Molecular Models of Hydroxide, Oxyhydroxide, and Clay Phases and the Development of a General Force Field", *J Phys Chem B*, vol. 108, pp. 1255-1266.
Deem, M. W. et al., (2009) "Computational Discovery of New Zeolite-Like Materials", *J Phys Chem C*, 113, pp. 21353-21360.
Demiralp, E., et al., (1999) "Morse Stretch Potential Charge Equilibrium Force Field for Ceramics: Application to the Quartz-Stishovite Phase Transition and to Silica Glass", *Physical Review Letters*, vol. 82(8), pp. 1708-1711.
Dubbeldam, D. et al. (2016) "RASPA: molecular simulation software for adsorption and diffusion in flexible nanoporous materials" *Molecular Simulation*, (published online Feb. 26, 2015), vol. 42(2), pp. 81-101.
Dubbeldam, D., et al., (2013) "On the inner workings of Monte Carlo codes" *Molecular Simulation*, vol. 39, Nos. 14-15, pp. 1253-1292.
Earl, D. J. et al., (2005) "Parallel tempering: Theory, applications, and new perspectives," *Phys Chem Chem Phys*, vol. 7, pp. 3910-3916.
ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.
Fang, H. et al., (2013) "First principles derived, transferable force fields for CO2 adsorption in Na-exchanged cationic zeolites," *Phys Chem Chem Phys*, vol. 15, pp. 12882-12894.
Fang, H., et al., (2012) "Prediction of CO2 Adsorption Properties in Zeolites Using Force Fields Derived from Periodic Dispersion-Corrected DFT Calculations," J Phys Chem C, 10692, 116, ACS Publications.
Farooq, S. et al. (1990) "Continuous Countercurrent Flow Model for a Bulk PSA Separation Process," *AIChE J.*, v36 (2) p. 310-314.
FlowServe (2005) "Exceeding Expectations, US Navy Cuts Maintenance Costs With Flowserve GX-200 Non-Contacting Seal Retrofits," *Face-to-Face*, v17.1, 8 pgs.
Foster, M.D., et al. "A geometric solution to the largest-free-sphere problem in zeolite frameworks", *Microporous and Mesoporous Materials*, vol. 90, pp. 32-38.
Frenkel, D. et al., (2002) "Understanding Molecular Simulation: From Algorithms to Applications", 2nd ed., *Academic Press*, pp. 292-301.
Garcia, E. J., et al. (2014) "Tuning the Adsorption Properties of Zeolites as Adsorbents for CO2 Separation: Best Compromise between the Working Capacity and Selectivity", *Ind. Eng. Chem. Res.*, vol. 53, pp. 9860-9874.
GE Oil & Gas (2007) "Dry Gas Seal Retrofit," Florene, Italy, www.ge.com/oilandgas, 4 pgs.
Harris, J. G. et al., (1995) "Carbon Dioxide's Liquid—Vapor Coexistence Curve and Critical Properties as Predicted by a Simple Molecular Model", *J Phys Chem*, vol. 99, pp. 12021-12024.
Hill, J. R. et al., (1995) "Molecular Mechanics Potential for Silica and Zeolite Catalysts Based on ab Initio Calculations. 2. Aluminosilicates", *J Phys Chem*, vol. 99, pp. 9536-9550.
Hopper, B. et al. (2008) "World's First 10,000 psi Sour Gas Injection Compressor," *Proceedings of the 37th Turbomachinery Symposium*, pp. 73-95.
Jain, S., et al. (2003) "Heuristic design of pressure swing adsorption: a preliminary study", *Separation and Purification Technology*, vol. 33, pp. 25-43.
Kim J. et al. (2012) "Predicting Large CO2 Adsorption in Aluminosilicate Zeolites for Postcombustion Carbon Dioxide Capture", *J. Am. Chem, Soc.*, vol. 134, pp. 18940-18940.

(56) References Cited

OTHER PUBLICATIONS

Kärger, J., et al. (2012) "Diffusion in Nanoporous Materials", Whiley-VCH publisher, vol. 1, Chapter 16, pp. 483-501.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Lin, L., et al. (2012) "In silico screening of carbon-capture materials", *Nature Materials*, vol. 1, pp. 633-641.

Liu, Q. et al., (2010) "NaKA sorbents with high $CO_2$-over-$N_2$ selectivity and high capacity to adsorb $CO_2$," *Chem Commun*, vol. 46, pp. 4502-4504.

Lowenstein, W., (1954) "The Distribution of Aluminum in the Tetra-Hedra of Silicates and Aluminates" Am Mineral, 92-96.

Neimark, A. V. et al., (1997) "Calibration of Pore Volume in Adsorption Experiments and Theoretical Models", *Langmuir*, vol. 13, pp. 5148-5160.

Palomino, M., et al. (2009) "New Insights on CO2-Methane Seapration Using LTA Zeolites with Different Si/Al Ratios and a First Comparison with MOFs", Langmar, vol. 26(3), pp. 1910-1917.

Patcas, F.C. et al.(2007) "CO Oxidation Over Structured Carriers: A Comparison of Ceramic Forms, Honeycombs and Beads", *Chem Engineering Science*, v. 62, pp. 3984-3990.

Peng, D. Y., et al., (1976) "A New Two-Constant Equation of State", *Ind Eng Chem Fundam*, vol. 15, pp. 59-64.

Pham, T. D. et al., (2013) "Carbon Dioxide and Nitrogen Adsorption on Cation-Exchanged SSZ-13 Zeolites", *Langmuir*, vol. 29, pp. 832-839.

Pophale, R., et al., (2011) "A database of new zeolite-like materials", *Phys Chem Chem Phys*, vol. 13(27), pp. 12407-12412.

Potoff, J. J. et al., (2001) "Vapor-Liquid Equilibria of Mixtures Containing Alkanes, Carbon Dioxide, and Nitrogen", AIChE J, vol. 47(7), pp. 1676-1682.

Rameshni, Mahin "Strategies for Sour Gas Field Developments," *Worley Parsons-Brochure*, 20 pp.

Reyes, S. C. et al. (1997) "Frequency Modulation Methods for Diffusion and Adsorption Measurements in Porous Solids," *J. Phys. Chem. B*. v101, pp. 614-622.

Rezaei, F. et al. (2009) "Optimum Structured Adsorbents for Gas Separation Process", *Chem. Engineering Science*, v. 64, pp. 5182-5191.

Richardson, J.T. et al. (2000) "Properties of Ceramic Foam Catalyst Supports: Pressure Dop", *Applied Catalysis A: General* v. 204, pp. 19-32.

Robinson, D. B., et al., (1985) "The development of the Peng—Robinson Equation and its Application to Phase Equilibrium in a System Containing Methanol," *Fluid Phase Equilibria*, vol. 24, pp. 25-41.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Reliability in Centrifugal Compressors," *Dresser-Rand, Tech. Paper 134*, 15 pages.

Santos, M. S (2011) "New Cycle configuration to enhance performance of kinetic PSA processes" Chemical Engineering Science 66, pp. 1590-1599.

Snurr, R. Q. et al., (1993) "Prediction of Adsorption of Aromatic Hydrocarbons in Silicalite from Grand Canonical Monte Carlo Simulations with Biased Insertions", *J Phys Chem*, vol. 97, pp. 13742-13752.

Stemmet, C.P. et al. (2006) "Solid Foam Packings for Multiphase Reactors: Modelling of Liquid Holdup and Mass Transfer", *Chem. Engineering Research and Design*, v. 84(A12), pp. 1134-1141.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

Talu, O. et al., (2001), "Reference potentials for adsorption of helium, argon, methane, and krypton in high-silica zeolites," *Colloids and Surfaces A: Physicochemical and Engineering Aspects*, vol. 83-93, pp. 83-93.

Walton, K. S. et al., (2006) "CO2 adsorption in Y and X zeolites modified by alkali metal cation exchange," *Microporous and Mesoporous Mat*, vol. 91, pp. 78-84.

Willems, T. F. et al., (2012) "Algorithms and tools for high-throughput geometry-based analysis of crystalline porous materials" *Microporous Mesoporous Mat*, vol. 149, pp. 134-141.

Zukal, A., et al., (2009) "Isosteric heats of adsorption of carbon dioxide on zeolite MCM-22 modified by alkali metal cations", *Adsorption*, vol. 15, pp. 264-270.

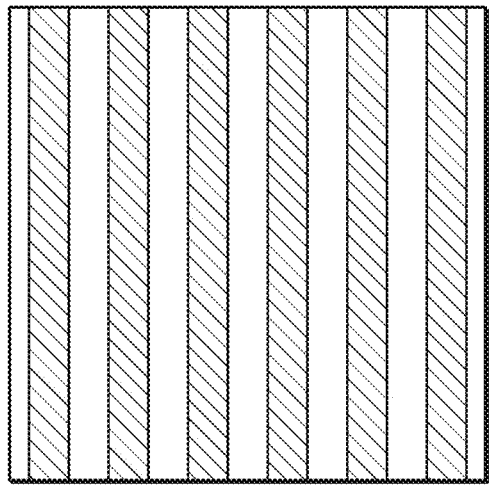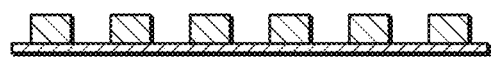
FIG. 2A
FIG. 2B
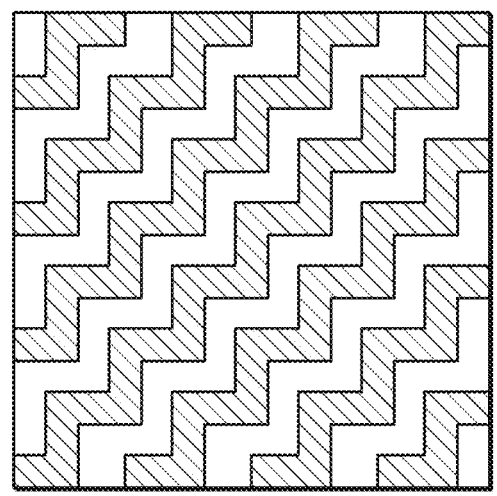
FIG. 3

HIGH CAPACITY STRUCTURES AND MONOLITHS VIA PASTE IMPRINTING

CROSS REFERENCE TO RELATED APPLICATIONS

This is a divisional of U.S. patent application Ser. No. 14/880,557, filed Oct. 12, 2015, which claims the priority benefit of U.S. Provisional Patent Application 62/077,977 filed Nov. 11, 2014 entitled HIGH CAPACITY STRUCTURES AND MONOLITHS VIA PASTE IMPRINTING, the entirety of which is incorporated by reference herein.

TECHNICAL FIELD

The various embodiments of the disclosure relate generally to structures and monoliths, prepared by coating a composite material onto a support, and layering supports together to form a layered assembly or structure. The composite material can have an active material in it, typically a catalyst or an adsorbent. The technology can be applied to prepare monoliths for gas adsorption, medium separations, or catalytic processes.

BACKGROUND OF THE INVENTION

Numerous processes and devices rely on monolithic structures acting as supports for a catalyst layer. Several methods are used to create the monolithic structures, the two main routes being ceramic extrusion and spiral wound foils. Monoliths can be created by extruding a ceramic to form a ceramic monolith having channels passing through the body of the monolith structure. Monoliths can also be created from metal foils, particularly corrugated metal foils, which are spiral-wound to form a support, and a catalyst or adsorbent then coated down onto the support. This method is often hampered by clogging or poor coating results when the structures or channels on a support become too small. In other words, monolith microstructures can reach a size below which applying the coating becomes impractical.

Moreover, the effectiveness of many processes is proportionate to the amount of available surface area, particularly in catalysis or adsorption. Decreasing the size of channels in a monolith leads to more surface area for reactivity, but there are limits to how small the channels can become before coating becomes impractical. Moreover, processes that require a significant amount of surface area of catalyst/adsorbent are typically hindered by large pressure drops in the reactor. For example, rapid cycle swing adsorption processes with extremely short cycle times typically require structured adsorbent beds (rather than randomly packed beds) to reduce the pressure drop in the bed. Laminar flow in these systems can be ideal if the adsorbent can be aligned in a straight channel fashion. Coating straight channel structures (e.g. monoliths) with adsorbent is one option, but remains challenging due to the small size of the channels.

BRIEF SUMMARY

The various embodiments of the disclosure relate generally to structures having layered supports and passageways between the supports. Active materials can be in the layered supports. The structures can be monoliths, and can be used in catalysis and adsorption processes, including gas adsorption processes such as pressure swing adsorption and temperature swing adsorption.

An embodiment of the disclosure can be a structure comprising layered coated supports and passageways between adjacent layered coated supports. Each layered coated support can be a support having a first and second side, and a composite on at least the first side of the support. The composite can include an active material, and can have features in the surface of the composite. The passageways of the structure can be formed by the contact of the features in a coating on the first side of a layered structure with a side of an adjacent layered structure. The composite can also include a binder.

In some embodiments, the support can be a metal substrate. The support can be a sheet, foil or mesh. The support can be coated with the composite material, and the composite material can include active material. The active material can be a catalyst or can be an adsorbent. In some embodiments, the active material can be a zeolite.

In some embodiments, the layered coated support can further include a composite on the second side. Passageways can be formed at the contact of the features in the coating on the first side of a coated support with a composite on the second side an adjacent support.

An embodiment of the disclosure can include a structure that is a monolith. The monolith can have passageways through its structure that are small, and can have cell densities greater than current monolith technology. In some embodiments, the cell density of the monolith can be at least 900 cpsi, or at least 1000 cpsi, or at least 1500 cpsi. In an embodiment, when the features in the structure are channels, the distance between channels is less than about 900 microns.

In some embodiments of the disclosure, the layered coated supports can be separate supports, and the passageways are formed at the contact of the first side of one support with the second side of a separate support. In some embodiments, layered coated supports can be a single coated support coiled in a spiral, and the passageways are formed at the contact of the first side of the coated support with the second side of the coated support.

An embodiment of the disclosure can be a structure including layered coated supports and passageways between adjacent layered coated supports, where each layered coated support includes a support having a first and second side, and a composite on at least the first side of the support, and the composite includes an active material and tortuous pathways through the composite for fluid communication of the adsorbent with the passageways, and having features in the surface of the composite. The composite further include a binder.

In some embodiments, the composite has a mesoporosity. The mesoporosity can be at least about 15%, or at least about 20%.

In some embodiments, the composite can enclose some or all of the active material. The composite can enclose at least about 15% of the active material, or at least about 20% of the active material.

An embodiment of the disclosure includes a method for preparing the structure. The method includes coating on a support having a first side and a second side a paste to the first side; creating features in the paste; layering a first coated support with a second coated support by contacting the paste on the first side of the coated support with a side of the second coated support to form enclosed passageways; and calcining the layered supports to form the structure.

In some embodiments, the side of the support is a second side of a support coated with a thin layer of paste, and the enclosed passageways are formed by the contact of the paste with features of the first support to the thin layer of paste on the second side of the second support. The features can be created in the paste by imprinting, stamping, molding, dragging or 3-D printing. A paste layer can be coated on the second side of the support, and features can be created in the paste on the second side.

In some embodiments, the support can be a metal substrate. The support can be a sheet, foil or mesh. In some embodiments, a paste can be coated onto the support. The paste can include a binder and an active material. The active material can be a catalyst or can be an adsorbent. In some embodiments, the active material can be a zeolite.

In some embodiments, the layering step can be layering a coated support onto a separate coated support to form layers of coated supports. In some embodiments, the layering step can include one or more coated supports coiled in a spiral such that the first side of a support can contact the second side of a support to form the enclosed passageways within a spiral structure.

BRIEF DESCRIPTION OF THE DRAWINGS

FIGS. 2A and 2B illustrate a coated support having linear features or channels, in accordance with an exemplary embodiment of the disclosure.

FIG. 3 illustrates another coated support having stair-step or zigzag features, in accordance with an exemplary embodiment of the disclosure.

DETAILED DESCRIPTION

Figure 1:
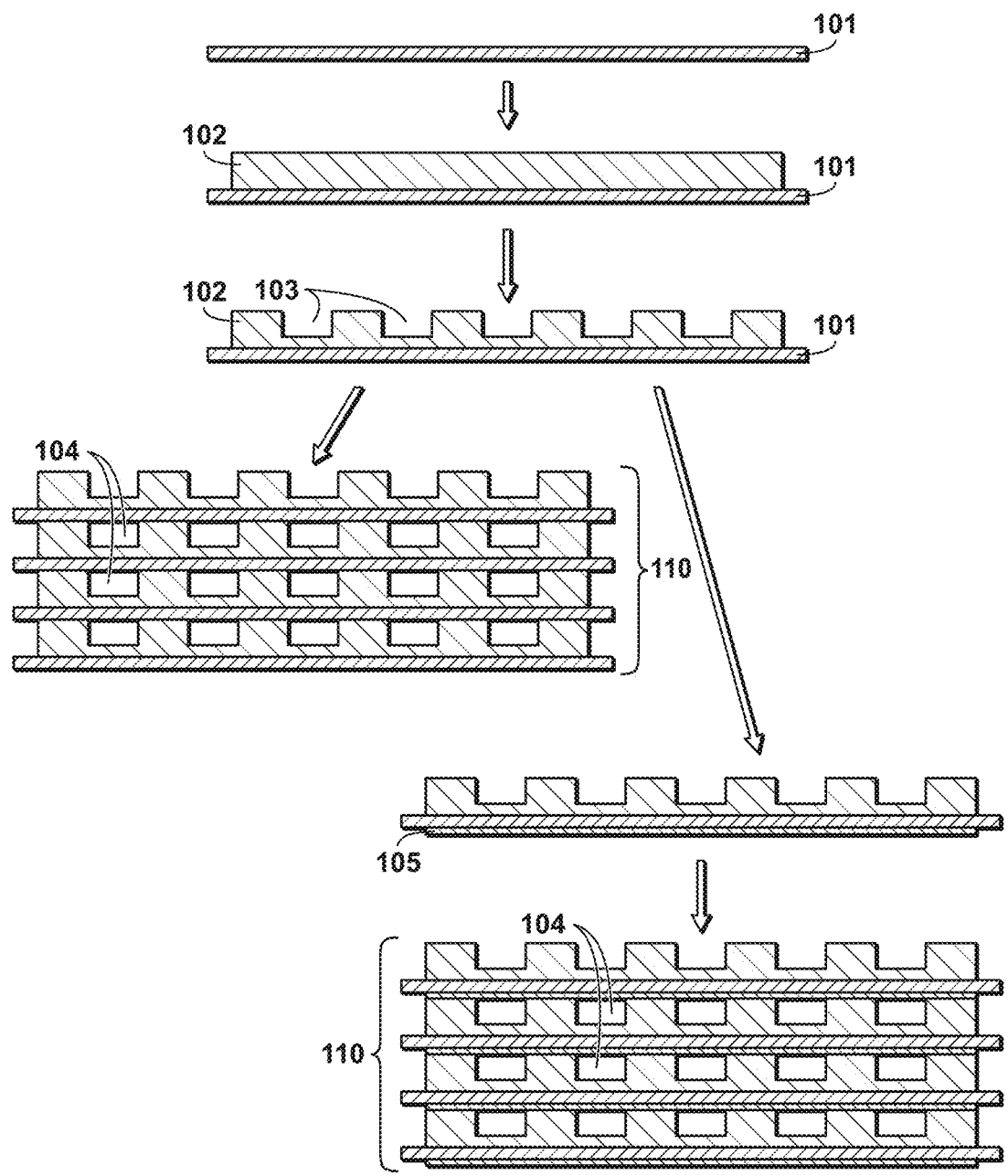
FIG. 1 illustrates a structure and assembling of the structure, in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "comprises" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosure includes a structure that comprises layers of coated supports, and passageways between the layers. The disclosure also includes a method for preparing, or a method for constructing, the structures, which allows for the design of features in the layers of paste, which creates the passageways in the structure. The structure can be applied to a variety of technologies, including catalysis and adsorption processes, and can incorporate a variety of features as further discussed herein. An example of a structure is a monolith, which can be applied to a variety of these technologies.

One aspect of the disclosure is a composite in the structure or monolith, and the paste used to produce the composite. As discussed further below, a paste can be coated onto a support, dried, and optionally further processed to produce the composite. The paste can contain an active material and solvent, and optionally a binder. By virtue of the drying process, the composite can contain an active material. The composite can further include a binder. The active material can typically be an adsorbent or a catalyst. More than one active material can be included in the composite, and the more than one active material can be applied in the same section of the support, and uniformly throughout the structure. Alternatively, the more than one active material can be applied to different sections of the support, such as in composites or pastes on different sides of a support. The composite may or may not also contain residual solvent. The paste and composite in this disclosure contain high loadings or volume fractions of active material, and thereby can produce high capacity monoliths that are not attainable using traditional coating technologies.

In some embodiments, the composite or paste can include an active material. The active material can be an adsorbent or a catalyst. For adsorbents, any adsorbent applicable in gas separation or medium separation technology can be used. Medium separation is important in various industries, including but not limited to, the production of fuels, chemicals, petrochemicals, purified gases, and specialty products. The term "medium" is used herein for convenience and refers generally to many fluids, liquids, gases, solutions, suspensions, powders, gels, dispersions, emulsions, vapors, flowable materials, multiphase materials, or combinations thereof. A medium can comprise a feed stream. A medium can comprise a mixture of a plurality of components. The term "plurality" as used herein refers to more than one. Preferably the medium herein is a gas, and the adsorbents are being applied in gas separation technologies.

Medium separation can be accomplished by many methods that, assisted by heat, pressure, solids, fluids, or other means, generally exploit the differences in physical and/or chemical properties of the components to be separated. Gas separation can be achieved by partial liquefaction or by utilizing an adsorbent material that preferentially retains or adsorbs a more readily retained or adsorbed component relative to a less readily adsorbed component of the gas mixture.

Pressure swing adsorption (PSA) and temperature swing adsorption (TSA) are two commercially practiced gas separation process. TSA comprises a process wherein a bed of adsorbent material is used to separate one or more components out of a stream of a medium, and then the adsorbent bed can be regenerated, thereby releasing the adsorbed components, by increasing the temperature of the bed. PSA similarly includes a bed of material used to separate one or more major components from a medium, but the absorbent bed can be regenerated by changing the pressure of the system.

Both TSA and PSA processes can comprise preferential adsorption of at least one component of a medium by an adsorbent material relative to a second component or other components in the medium. The total amount of the at least one component adsorbed from the medium (i.e., the adsorption capacity of the adsorbent material) and the selectivity of the adsorption for one component over another component of the medium, can often be improved by operating the adsorption process under specific pressure and temperature conditions, as both pressure and temperature may influence the adsorption loading of a component of the medium. The adsorbed component can be later desorbed from the adsorbent material.

Adsorption and desorption of a component in TSA occurs because adsorption isotherms are strongly influenced by temperature. Thus, high purities of a component of a medium can be obtained by adsorbing at low temperature, where adsorption is strong, with the release of a strongly held component being possible by means of high temperature for desorption. In TSA processes, heat for desorption may be supplied directly to the adsorbent material by flowing a hot desorbent medium through the bed, or indirectly to the adsorbent material through a heating coil, electrical heat source, heat transfer medium, or heat exchanger, among others, which are in intimate association with the adsorbent material.

Adsorption and desorption of a component in PSA occurs because adsorption of gases in a medium increases with at increasing pressure. Different gases tend to have different adsorption coefficients with different substrates, so a mixture of gases can be passed through at bed at higher pressure to selectively adsorb at least one of the gases in the mixture. Once the bed reaches the end of its capacity, the pressure can be reduce to collect the adsorbed gas and regenerate the adsorbent.

The PSA and TSA processes do not have to be exclusively only pressure or temperature. The pressure in a TSA process can also be changed during adsorption/desorptions, and the temperature in a PSA process can also be changed during adsorption/desorptions. Moreover, purge gases or other means might also be used in conjunction with PSA and/or TSA processes.

In each of the TSA and PSA processes, the nature of the adsorbent and the nature of the structure containing the adsorbent can impact both the type of adsorption, effectiveness and efficiency of adsorption, and capacity for a gas in the process.

The adsorbent in this disclosure can be a material suitable for adsorption of a gas in a gas separation or removal process. The adsorbent can be a material effective in a pressure swing adsorption process or a temperature swing adsorption process. In some embodiments, the adsorbent can be a material that adsorbs $CO_2$ from a gas stream. In an embodiment, the adsorbent can be a zeolite, metal oxide, metal organic framework, zeolitic imidozolate framework, or activated carbons. Preferably, the adsorbent can be a zeolite. The zeolite can be any zeolite used in an adsorption process, including but not limited to zeolite A, zeolite X, zeolite Y, MFI, mordenite, silicalite, chabasite, faujasite, and variations of these frameworks.

In some embodiments, the active material in the composite or paste can be a catalyst. The catalyst can be any material applicable to a catalytic process, including for example chemical processes such as catalytic conversion, isomerization, polymerization, or other reaction. The catalysts in the composites and monoliths of this disclosure can be used to catalyze a wide variety of organic compound conversion processes including many of present commercial/industrial importance. Examples of chemical conversion processes effectively catalyzed by the crystalline material of this invention, by itself or in combination with one or more other catalytically active substances including other crystalline catalysts, can include those requiring a catalyst with acid activity. Specific examples can include, but are not limited to:

(a) alkylation of aromatics with short chain ($C_2$-$C_6$) olefins, e.g., alkylation of ethylene or propylene with benzene to produce ethylbenzene or cumene respectively, in the gas or liquid phase, with reaction conditions optionally including one or more of a temperature from about 10° C. to about 250° C., a pressure from about 0 psig to about 500 psig (about 3.5 MPag), a total weight hourly space velocity (WHSV) from about 0.5 $hr^{-1}$ to about 100 $hr^{-1}$, and an aromatic/olefin mole ratio from about 0.1 to about 50;

(b) alkylation of aromatics with long chain ($C_{10}$-$C_{20}$) olefins, in the gas or liquid phase, with reaction conditions optionally including one or more of a temperature from about 250° C. to about 500° C., a pressure from about 0 psig to 500 psig (about 3.5 MPag), a total WHSV from about 0.5 $hr^{-1}$ to about 50 $hr^{-1}$, and an aromatic/olefin mole ratio from about 1 to about 50;

(c) transalkylation of aromatics, in gas or liquid phase, e.g., transalkylation of polyethylbenzenes and/or polyisopropylbenzenes with benzene to produce ethylbenzene and/or cumene respectively, with reaction conditions optionally including one or more of a temperature from about 100° C. to about 500° C., a pressure from about 1 psig (about 7 kPag) to about 500 psig (about 3.5 MPag), and a WHSV from about 1 hr$^{-1}$ to about 10,000 hr$^{-1}$;

(d) disproportionation of alkylaromatics, e.g., disproportionation of toluene to produce xylenes, with reaction conditions optionally including one or more of a temperature from about 200° C. to about 760° C., a pressure from about 1 atm (about 0 psig) to about 60 atm (about 5.9 MPag), a WHSV from about 0.1 hr$^{-1}$ to about 20 hr$^{-1}$, and a hydrogen/hydrocarbon mole ratio from 0 (no added hydrogen) to about 50;

(e) dealkylation of alkylaromatics, e.g., deethylation of ethylbenzene, with reaction conditions optionally including one or more of a temperature from about 200° C. to about 760° C., a pressure from about 1 atm (about 0 psig) to about 60 atm (about 5.9 MPag), a WHSV from about 0.1 hr$^{-1}$ to about 20 hr$^{-1}$, and a hydrogen to hydrocarbon mole ratio from 0 (no added hydrogen) to about 50;

(f) isomerization of alkylaromatics, such as xylenes, with reaction conditions optionally including one or more of a temperature from about 200° C. to about 540° C., a pressure from about 100 kPaa to about 7 MPaa, a WHSV from about 0.1 hr$^{-1}$ to about 50 hr$^{-1}$, and a hydrogen/hydrocarbon mole ratio from 0 (no added hydrogen) to about 10;

(g) reaction of paraffins with aromatics, e.g., to form alkylaromatics and light gases, with reaction conditions optionally including one or more of a temperature from about 260° C. to about 375° C., a pressure from about 0 psig to about 1000 psig (about 6.9 MPag), a WHSV from about 0.5 hr$^{-1}$ to about 10 hr$^{-1}$, and a hydrogen/hydrocarbon mole ratio from 0 (no added hydrogen) to about 10;

(h) paraffin isomerization to provide branched paraffins with reaction conditions optionally including one or more of a temperature from about 200° C. to about 315° C., a pressure from about 100 psig (about 690 kPag) to about 1000 psig (about 6.9 MPag), a WHSV from about 0.5 hr$^{-1}$ to about 10 hr$^{-1}$, and a hydrogen to hydrocarbon mole ratio from about 0.5 to about 10;

(i) alkylation of iso-paraffins, such as isobutane, with olefins, with reaction conditions optionally including one or more of a temperature from about −20° C. to about 350° C., a pressure from about 0 psig to about 700 psig (about 4.9 MPag), and a total olefin WHSV from about 0.02 hr$^{-1}$ to about 10 hr$^{-1}$;

(j) dewaxing of paraffinic feeds with reaction conditions optionally including one or more of a temperature from about 200° C. to about 450° C., a pressure from about 0 psig to about 1000 psig (about 6.9 MPag), a WHSV from about 0.2 hr$^{-1}$ to about 10 hr$^{-1}$, and a hydrogen/hydrocarbon mole ratio from about 0.5 to about 10;

(k) cracking of hydrocarbons with reaction conditions optionally including one or more of a temperature from about 300° C. to about 700° C., a pressure from about 0.1 atm (about 10 kPag) to about 30 atm (about 3 MPag), and a WHSV from about 0.1 hr$^{-1}$ to about 20 hr$^{-1}$;

(l) isomerization of olefins with reaction conditions optionally including one or more of a temperature from about 250° C. to about 750° C., an olefin partial pressure from about 30 kPa to about 300 kPa, and a WHSV from about 0.5 hr$^{-1}$ to about 500 hr$^{-1}$; and (m) a hydrocarbon trap (e.g., pre-catalytic converter adsorbent) for cold start emissions in motor vehicles.

In some embodiments, the paste and the composite in the disclosure can each further include a binder. The binder can be any binder applicable to preparing a structure. In an embodiment, the binder can be alumina, inorganic and organic polymers, silica. In some embodiments, the paste can include additional materials and additives. In one embodiment, the paste can also include a polymer, particularly a cellulosic polymer, which can be removed later during processing and calcination. Removal of the polymer during processing can produce a porous composite, i.e. a composite that contains pores, specifically mesopores within the composite. In another embodiment, an inorganic additive, such as sodium silicate, can be included. Calcination of the composite can integrate the additive into the structure as a binding agent.

Other aspects of the composites and pastes are characterized further below. With the composite and paste initially described, the method for preparing the monoliths can be described in more detail.

A method for preparing a monolith is disclosed, including the steps of coating a support, creating features in the support, layering supports together and drying the support to form the monolith. In an embodiment, the method can include the steps of coating, on a support having a first side and a second side, a paste on the first side of the support, creating features in the paste, layering a first coated support with a second coated support by contacting the paste on one side of the coated support with one side of the second coated support to form enclosed passageways, and drying the layered supports to form the monolith.

FIG. 1 provides a general scheme for the method of preparing a monolith and the resulting monolith itself. A support 101 can be coated with the paste 102. Features 103 can be created in the paste 102. In FIG. 1, the features 103 do not completely remove the paste 102, but this thin layer is not necessarily required. In instances where the support 101 is a mesh, some portion of the paste can be embedded within the support, while foil supports can have a thin layer between features. The coated supports can then be layered upon each other to form a structure 110 having passageways 104 that are created by the contact of two layered coated supports.

In an embodiment, coating the paste 102 can be on only one side of the support 101, or on both sides of the support, as shown for paste 105. In some embodiments, the paste on the second side can be a thin coating. In other embodiments, the paste can be a thicker coating. In some embodiments, the paste 105 can also have features created in the coating. In an embodiment, coating the paste can also be on the second side of the support, and the enclosed passageways are formed by contacting of the paste with features of the first support to the paste on the second side of the second support. In some embodiments, a support can be used that allows the application of the paste on one side to establish a coating layer on both sides, such as for example, by applying a paste to one side of a mesh support such that a portion of the paste passes through the mess and onto the opposite side of the support.

The step of coating the support can be by any method known to one of ordinary skill in coating a paste onto a support. In an embodiment, the paste can be applied by knife coating, roll coating, dip coating or spray coating.

The features created in the paste can determine the nature and shape of passageways created in the final monolith. Features can be any shape that can be created in a paste. In an embodiment, the feature can be a groove that traverses the paste in a direction roughly parallel to the surface of the support. The groove can include any groove, and can be linear, non-linear, wavy, sinusoidal, zig-zagged, or stair-stepped. When the feature is a groove, the cross-sectional shape of the groove, i.e. the shape of the groove when viewed as a cross-section perpendicular to the surface of the support, can also be described. Generally, the groove can be any shape that can be applied to a paste, including a cross-sectional shape of a square, a triangular, or a sloped valley, or a shape that is generally parabolic. A representation of a linear groove is shown in FIG. 2a, and its cross-sectional view is shown in FIG. 2b. A stair-stepped groove is shown in FIG. 3.

Figure 4A:
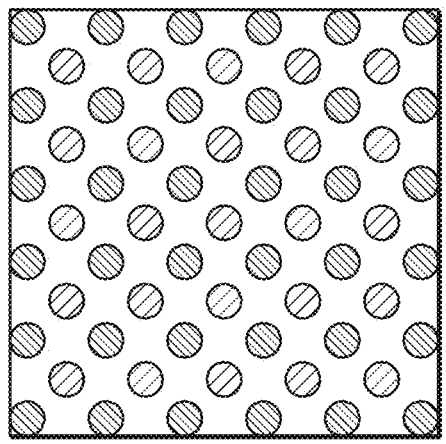
FIGS. 4A and 4B illustrates another coated support having features as pillars, in accordance with an exemplary embodiment of the disclosure.
Figure 4B:

The feature does not need to be a groove, but can include other structures such as hills, mesas, pillars, cylinders, mounds, or cones. In a nonlimiting example, a feature created in the paste could be a series of pillars placed at regular intervals such that the pillars form a grid design, with the pillars of paste having a height greater than the surrounding paste. A representation of features as a series of pillars in a grid pattern is shown in FIG. 4a, and its cross-sectional view is shown in FIG. 4B. Any grid pattern of pillars can be created in the composite.

Figure 5:
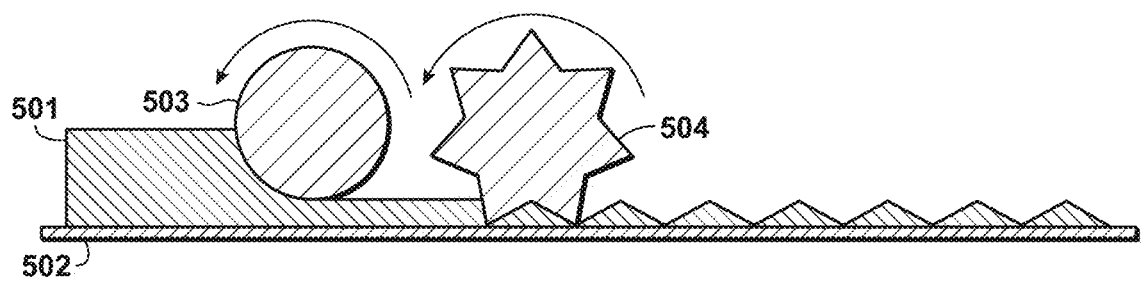
FIG. 5 illustrates a method for coating and imprinting features on a support, in accordance with an exemplary embodiment of the disclosure.

Creating the features in the paste can be by any method known to one of ordinary skill. The features can be created by imprinting the feature into the paste, stamping the feature into the paste, molding the paste to create the feature, dragging through the paste to create the features, or rolling the paste with device having the feature. For example, as shown in FIG. 5, the features can be created by coating a paste 501 on a support 502, then longitudinally passing the support first through a roller 503 to flatten and spread the paste, then through an imprinting roller 504 with axial features to create the desired imprinted structure. Similarly, imprinting rollers with circumferential features can roll transversely across the support. In another example, the paste can be applied to a support, and then a mold can be pressed into the paste and removed to create the features of the mold on the paste. In an example with a mesh support, the paste can be pressed through the mesh and into a mold on the opposite side to create the features in the paste. In another example, the features can be created by injecting paste to a mold that incorporates the support. The features can also be created by stamping presses and dies, or by creating a paste layer having features in it using a 3-D printing technique. The ability to prepare features to the paste using a mold or stamp, or by creating features using a 3-D printing technique, thus provides access to shapes, patterns and structures, including different levels of complexity that cannot be accessed by traditional monolith technologies.

The steps of coating the support and creating features in the support can occur in any order or simultaneously. Because the support can be included in part of a mold or created using a 3-D printing technique, can in some instances occur simultaneously. Similarly, features can be created in a paste first, and then the paste applied to a support, e.g. a paste applied in a mold, and then the support layered into the paste of the mold.

The step of coating the paste on to the support and creating features in the support do not necessarily represent separate steps, and can occur concurrently, or in any order. In one non-limiting example, the paste can be applied to a support while at the same time imprinting the features into the paste, such as, but not limited to, with an engraved roller (such as by gravure coating), in a rotary screen printing system, or by injecting a paste into a mold containing the support. In another embodiment, the paste can be applied with a 3-D printer which would create the paste and features simultaneously. In yet another embodiment, the features could be created in the paste with a mold first, and then the support applied to the paste while in the mold or during the removal from the mold.

After coating the support with the paste and creating the feature in the paste, the coated supports can be layered together to form a layered assembly. The layered assembly before drying can be termed a green monolith, an undried monolith, an uncalcined monolith, or a monolith precursor. In an embodiment, layering the coated supports can be layering a first coated support with a second coated support. The features in the first coated support can contact the second coated support to form passageways between the layers. When the feature is a groove, the passageways can be channels, and the method can include layering a first coated support with a second coated support by contacting the paste on the first coated support with the second coated support to form channels.

In some embodiments, the layering step can further include layering the first coated support with a second coated support, where the second side of the support is also coated with a thin layer of paste and the passageways are formed by the contact of the paste with grooves of the first support to the thin layer of paste on the second side of the second support. In an alternate embodiment, the layering step can include layering the first coated support with a second coated support, where the second side of the support is not coated with a thin layer of paste, and the passageways are formed by contract of the paste with the grooves of the first support to the uncoated second side of the second support.

Figure 6:
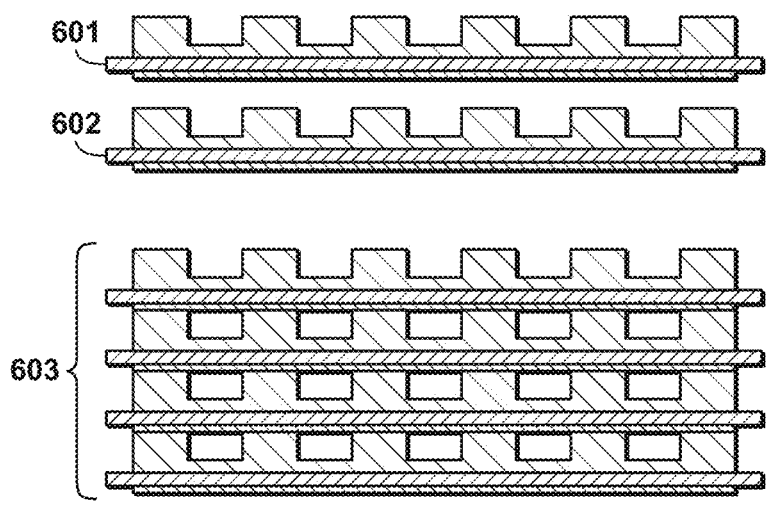
FIG. 6 illustrates an array of layered coated supports to form a structure, in accordance with an exemplary embodiment of the disclosure.

The layering step above can occur in an standard stacking pattern, where the first side of a first support is contacted with a second side of a second support. In such an standard stacking pattern, represented schematically in FIG. 6, the first side of a first coated support 601 would be layered with the second side of a second coated support 602, then the first side of the second coated support 602 would be layered with the second side of a third coated support, and so forth, to produce a structure 603.

Figure 7:
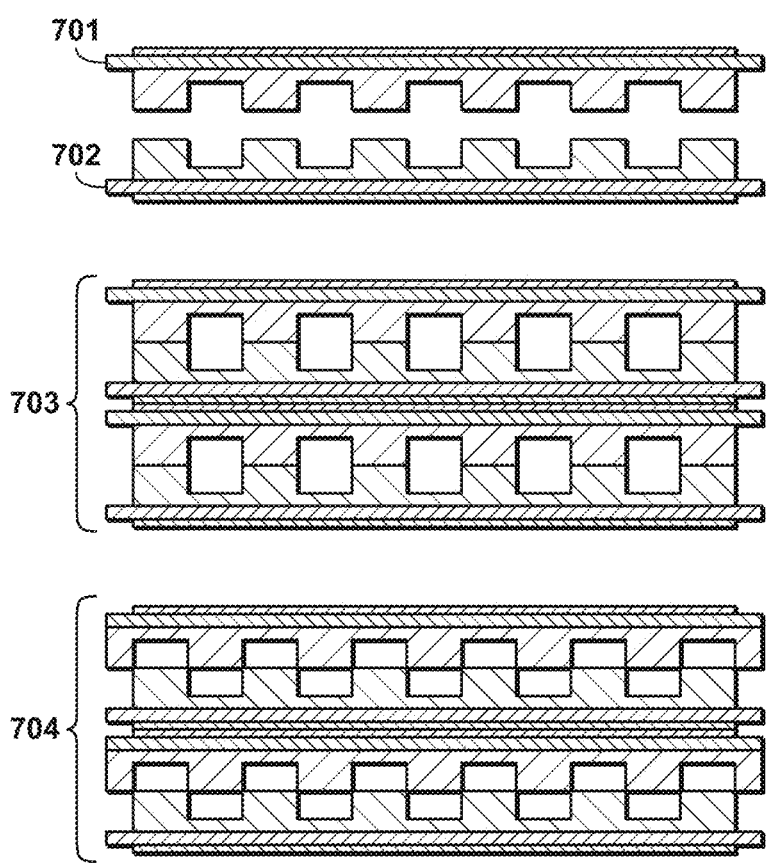
FIG. 7 illustrates another array of layered coated support to form a structure, in accordance with an exemplary embodiment of the disclosure.

However, other layering orders may also be conducted. For example, an alternating stacking pattern could be created. In a nonlimiting example, represented schematically in FIG. 7, the first side, i.e. the side with features, of a first coated support 701 could be layered with the first side, also with features, of a second coated support, 702, the second side of the second coated support 702 would be layered with the second side of a third coated support, then the first side of the third coated support would be layered with a first side of a fourth coated support, and so forth, to form structure 703, when the features, e.g. channels in FIG. 7, are aligned, or 704, when the features, e.g. channels in FIG. 7, are offset.

In some embodiments, the features can also be created in the coating on the second side of a support, including any of the features discussed for the first side of a support. The features of one support can then be combined with the features of another support to produce passageways within the structure that might not necessarily be producible in a single coating. In a nonlimiting example, the coating on a first side of a first support could have created in it linear channels, and the coating on the second side of a second support could have created in it linear channels. The two supports could be layered together such that the linear channels in each surface run parallel to each other. Alternatively, the two supports could be layered together such that the linear channels in each surface run perpendicular to each other. Similarly, the channels on two supports can be offset at any angle between 0 (parallel) and 90 degrees (perpendicular).

After the layered supports are formed, the layered assembly can be dried to form a dried assembly. The dried assembly can then be further processed to secure the layered coated supports together. Additional steps can be calcining, brazing, gluing, or other methods used to secure the supports into a fixed assembly. In an embodiment, the dried assembly can also be calcined. The calcining step can occur as a single step of drying and calcining, or the drying step can be conducted separately. Additional post-drying treatment or modification could optionally be conducted prior to the step of calcining. The drying step can generally be conducted at 120° C. or higher. The calcining step generally can be conducted at temperatures above 300° C. In a nonlimiting example, a layered assembly could be dried about 120° C. for 5 hours, then the temperature ramped up slow over several hours to prevent cracking, for example 1-2° C./min, and the assembly then calcined at between 400° C. to 700° C. for 5 hours to produce the monolith.

Figure 8:
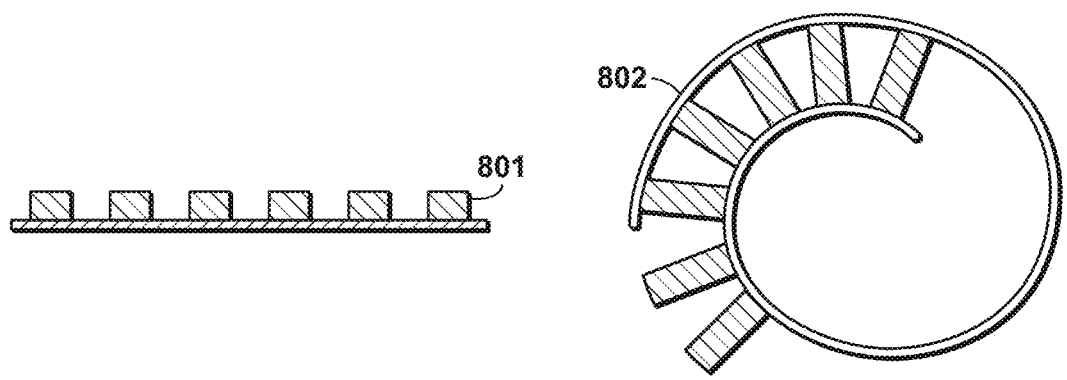
FIG. 8 illustrates a spiral winding of a coated support to form a coiled structure, in accordance with an exemplary embodiment of the disclosure.

The layering step can include a first and a second coated support. Those coated supports to be layered together can be two separate supports, such as two separate sheets or foils that are coated separately and then layered together, as shown in FIG. 1. Thus, in an embodiment, the layering step can be layering the first coated support with a separate coated support to form layers of coated supports. Alternatively, the coated supports can be part of one long coated support 801, and the layering can occur by coiling the coated support into a spiral shape 802, which brings the first side of the coated support into contact with the second side of the same coated support, as shown schematically in FIG. 8. The sections of the coated support that are in contact with each other are then separated linearly along the length of the support by the distance required to make a completed spiral, e.g. approximately 2 πr, where r is the radius of the coiled spiral at the point of contact being measured. Thus, in an embodiment, the layering step can be a single coated support coiled in a spiral such that the first side of the support can contact the second side of the support to form the enclosed passageways within a spiral structure. The layering step can also include a single support that is folded onto itself, or a single support that is wound in a serpentine manner In addition, more than one support could be layered together and then wound or folded. In an embodiment, two coated supports could be layered together and then coiled into a spiral.

In some embodiments, the same composite or paste can be used throughout a structure. However, because the coating of the paste can be controlled, structures having different types of composites or pastes can be created. For example, the coating on alternating faces of a support could be of different thicknesses. The coating on alternating faces of a support could include different active materials in each layer. Two supports could be layered together, each having a different paste on the support. The structures can then have more than one composite within the structure, and more than one active material within the structure.

With the method for creating the structure described above, the structure of the disclosure can also be described. The disclosure provides for a structure that can include layered supports and passageways between the layered supports. The layered coated supports can include a support having a first side and a second side, and a composite on at least one side. The composite can include a binder and an active material, preferably an adsorbent or a catalyst. The composite can have features in the composite. The passageways of the monolith can be formed at the contact of the features of the composite on the first side of a coated support with a side of an adjacent coated support.

In one embodiment, when the features are grooves, the resulting passageways are channels. The disclosure for a structure can then be layered supports and channels between the layered supports, the layered supports including a support having a first side and a second side, and a composite on at least one side, where the composite can include a binder and an active material. The composite can have grooves running laterally through the composite. The channels of the structure can be formed at the contact of the grooved composite on the first side of a coated support with a side of an adjacent coated support.

The coated supports can include any support suitable for construction and operation in these structures. In an embodiment, the support can be a sheet, a foil, a mesh, or a corrugated material. In one embodiment, the support can be a mesh or a corrugated material. A mesh substrate can be particularly suitable as a support. Mesh can provide an advantage because, when coated with a paste that forms the composite, the mesh can be integrated into the composite, forming a mixed material. The composite with the mesh can then be stronger rather than a composite by itself, similar to how rebar reinforces concrete. Mesh can also provide an advantage because the paste can be pushed through the mesh, forming a layer of paste on the opposing side of the mesh, which can produce a more flexible substrate which can be rolled into a monolith or other structure.

The support can also be composed of any type of material suitable for the purpose. In an embodiment, the support can be a metal substrate, a fiber substrate, or a fabric substrate, preferably a metal substrate. The substrate can also include wires or strings. Metal substrates can be particularly suitable as the metal can increase the heat capacity attained by the structure during operation, unlike traditional ceramic monoliths that do not maintain temperature as easily. The support material can be thermally and/or electrically conductive, allowing internal heating (e.g. electrical resistive heating) of the structure via the metal substrates. By using sheets, foils or meshes, the layered substrate can be more flexible as well, allowing for winding or bending that can form spiral wound shapes and other non-planar forms, as well as simple layering to form a stacked assembly.

The coated support can include a composite on at least a first side of the support. The coated support can also include a composite on at least the second side. In an embodiment, the coated support can include a composite on a first and a second side of the support. The coated support can include features in the composite on either of the first or second sides, preferably at least in the composite on the first side.

The passageways for the structure then can be formed at the contact of the composite having features on one side of a support with a side of an adjacent support. The contact of the layered structures can be in a standard stacking pattern, as discussed above. In a nonlimiting example, the first side of a first coated support contacts the second side of a second coated support, then the first side of the second coated support contacts the second side of a third coated support, and so forth. The contact of the coated supports can also be in other patterns. In a nonlimiting example, an alternating stacking pattern can be created, where the first side of a first coated support contacts the first side of a second coated support, the second side of the second coated support contacts the second side of a third coated support, then the first side of the third layered structure contacts a first side of a fourth coated support, and so forth.

The features and passageways of the disclosure can include many different shapes and patterns. The features can be described as grooves, and the passageways that result from the grooves can be described as channels. One example is a linear groove, which can then result in a linear channel, analogous to traditional monolith technology. However, the grooves and channels do not need to be linear, but can include shape. The groove or channel can be non-linear, wavy, sinusoidal, zig-zagged, or stair-stepped.

The composite can include any feature that can be created in a paste or composite. Due to the ability to mold and form patterns in the paste which dries to form the composite, any variety of shape can be included in the monolith. The feature does not need to be a groove, but can be other structures such as hills, mesas, pillars, cylinders, mounds, or cones. In a nonlimiting example, a composite could have a series of pillars placed at regular intervals such that the pillars form a grid design, with the pillars of composite having a height greater than the surrounding composite.

Figure 9:
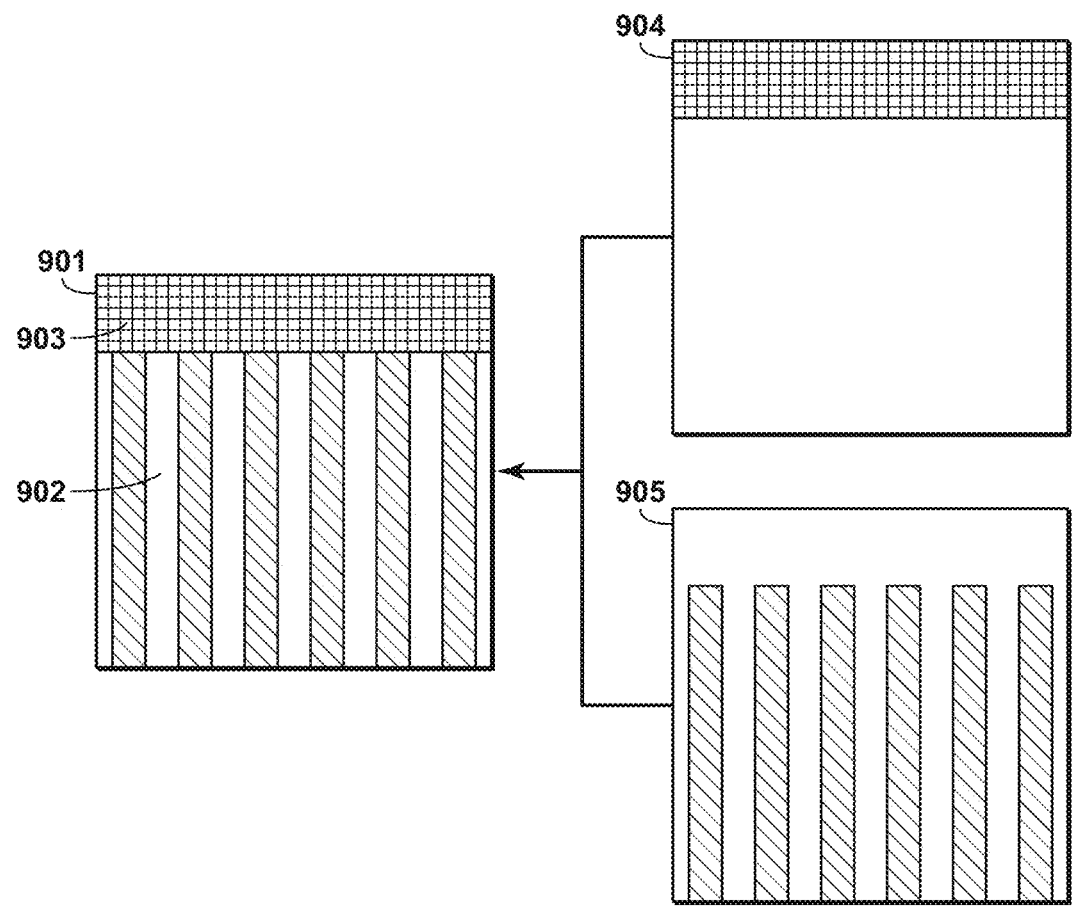
FIG. 9 illustrates layered coated supports, in accordance with an exemplary embodiment of the disclosure.

When features are formed in the composite or paste, the feature need not be continuously patterned throughout composite, but can instead be designed to construct monoliths with different flow shapes. For example, two coated supports can be created that have complementary channels created in sides that, when placed in contact produce a particular flow pattern. Moreover, the features need not provide a clear flow path through the structure. In a nonlimiting example shown in FIG. 9, a structure 901 can include passageways 902 that terminate at a wall 903. The wall 903 can be a porous substrate that can act as a ceramic filtration device or as a short pathway across an active material. Structure 901 can be created by molding or creating the channels and wall in a paste on support, and stacking supports according to a traditional stacking method. Alternative, structure 901 can be created by preparing two coated supports 904 and 905 which are layered together in a face to face manner to create the structure 901.

When two layers are in contact with each other, the distance between the supports for those two layers is bridged by the composite. In an embodiment, the monolith can have an average distance between layers, measured as the distance between two adjacent supports, and averaged for the monolith. In an embodiment, the average distance can be at least about 100-2000 microns. In some embodiments, the distance can be between about 1000-2000 microns. In other embodiments, the distance can be between about 100-1000 microns, from about 200-800 microns, from about 300-600 microns or from about 400-500 microns. The distance can be greater than 100 microns, greater than 200 microns, or greater than 300 microns. The distance can be less than 1000 microns, less than 800 microns, less than 700 microns, or less than 600 microns.

The method and the structures of this disclosure provide many potential advantages over the two main routes for manufacturing monoliths (i.e. ceramic extrusion or spiral-winding foils), both of which require a coating step in most cases. Extrusion of ceramics requires a die, where the features of the die shape the channels as the ceramic is extruded. Fabrication of dies for very small channels, and the working life of such dies, presents one type of limitation. Further, when the ceramic is extruded from a small feature die, the thin walls of the resulting extruded structure are thin and weak and are thus subject to slumping and deformation. Also, although extrusion of a monolith made purely from active material is possible, these lack often suitable mechanical strength. Wash coating high cell-density monoliths is challenging and is rarely practiced at densities>900 cpsi.

When larger particles are used or thicker coatings are desired, several additional challenges arise. For example the channels can be plugged by the larger particles due to large particles bridging across channels. The channels can also be plugged due to the multiple coating steps required for a thick coating and capillary forces that limit effective or thorough coatings.

This disclosure addresses these challenges by forming the passageways, using features in the adsorbent paste, into the desired thickness and shape. These can be controlled by choice of the appropriate template/mold. This allows for a higher density of active material per unit volume because less material is needed as compared to a coated monolith. This disclosure can have application in catalytic/adsorbent processes where diffusion into the active material is a limitation, where relatively lower pressure drop is needed, or where higher packing densities of adsorbent is beneficial. Structures, including monoliths, according to the disclosure can also be created that operate under laminar flow conditions, such as with linear channels. However, structures can also be designed that disrupt laminar flow to produce conditions similar to turbulent flow.

This disclosure overcomes the issues with traditional monoliths because there is no required coating step after formation of the small channels, and the process is not as sensitive to particle size. Additionally, the imprinted features do not support the weight of the overall structure because the support is part of the structure. So unlike extruded structures, the imprinted coated supports will not deform when it is still wet and conformable. The imprinted supports can be semi-rolled or completely rolled in the wet state, which can reduce the amount of stress the dried sheet is subjected to upon rolling. Finally, imprinting allows for an array of features in the surface beyond the linear channels currently available for extruded monoliths. For example, the shape of channels can be redesigned to provide, for example, wavy channels. Moreover, non-channel features can be selected instead, such as for example mesas, pillars, cylinders, mounds, or cones, which allow for new designs not attainable in traditional extruded or coiled monoliths.

Due to the features that can be constructed in the paste and the passageways that can be designed for the composite, the structures and monoliths disclosed can attain higher cell densities than current monolith technology. The cell density of the monolith can be at least about 900 cpsi, or at least about 1000 cpsi. In an embodiment, the cell density can be at least about 1200 cpsi, at least about 1500 cpsi, at least or at least about 2000 cpsi. In some embodiments, the cell density can be at least about 2500 cpsi, at least about 3000 cpsi, at least about 3500 cpsi, at least about 4000 cpsi, at least about 4500 cpsi, or at least about 5000 cpsi. However, while the disclosure allows for access to much higher capacities and increased cell densities, the disclosure is not limited to only those smaller features. Monoliths with lower cell densities can be created, including with densities between about 100 to 900 cpsi.

When the passageways in the structure are channels, the structure can also be described based on the distance between the channels. Current extruded monoliths can be limited by the size of the die and the requirement for extruding material, and limited by the ability to pass a coating solution through the channel. This disclosure is not limited by these formation issues or capillary action problems. Channels in the structure can be created where the distance between channels is less than about 900 microns. The distance between channels can be at least about 800 microns, at least about 700 microns, at least about 600 microns, or at least about 500 microns. The distance between channels can also be greater than 50 microns, greater than 75 microns, or greater than about 100 microns. The distance between channels can be between about 50 to 900 microns, between about 50 to 800 microns, or between about 50 to about 700 microns. The distance between the channels can be about 100 microns to about 900 microns, about 100 microns to about 800 microns, or about 100 microns to about 700 microns. While the disclosure allows for access to smaller channel sizes, the disclosure is not limited to only those smaller channels, and monoliths can be created with distances between about 900 µm to 2000 µm.

As discussed above, the composite can include an active material. The composite can further include a binder. The composite can have active material throughout the composite. And the composite can have more than one active material. The active material does not need to be at the surface of the composite, unlike typical monoliths where the material is coated only on the exterior surfaces of the monolith. Some amount of active material can be enclosed within the composite, meaning the amount of active material not directly exposed at the surface of a composite. In an embodiment, at least about 5% of the active material can be enclosed within the composite of the layered structure. The amount of active material enclosed within the composite of the layered structure can be at least about 10%, at least about 15%, or at least about 20%. The amount of active material enclosed within the composite can be up to about 100% of the active material.

However, despite being enclosed within the composite, the active material can be in fluid communication with the passageways in the structure, even when enclosed within the composite. The paste and process conditions can be selected to design a composite having a porous character, herein referred to as mesoporous, that can allow the active material within the composite to interact with the passageway. The nature of the mesoporosity in the composite provides for tortuous pathways within the composite. As a result, the active material can be in fluid communication with the passageways of the structure. The composite can have a mesoporosity of at least about 10%, at least about 15%, or at least about 20%. The mesoporosity can be up to about 90%, up to about 85%, or up to about 80%. The porosity can be about 15-85%, or about 20-80%. Thus, in an embodiment, the composite can be porous, e.g. mesoporous, and having tortuous pathways through the composite. In an embodiment, composite can include a binder, an active material, and mesopores within the composite. In an embodiment, composite can include a binder, an active material, and tortuous pathways through the composite for fluid communication of the adsorbent with the passageways.

Because the composite includes the active material within its structure, the amount of active material in a structure can be higher than traditional monoliths, where the active material was only coated on the surface to the structures. This increase leads to higher loadings of active material in this disclosure, and therefore higher capacity monoliths. The amount of active material loaded in the structure can be described as the weight of active material per weight of paste, where the range can be between 10 and 60% w/w of active material in the paste, for example at least about 15%, at least about 20%, at least about 25%, at least about 33%, at least about 40% or at least about 50%. The amount of active material loaded in structure can be described as the weight of active material per weight of composite, where the range can be between 20 to up to 100% w/w of active material in the composite, including at least about 25%, at least about 33%, at least about 40%, at least about 50%, at least about 66% or at least about 75%.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

EXAMPLES

Example 1

A coating method is demonstrated. Flat stainless steel foil (316 SS) was cleaned with a 10% bleach solution and calcined in air at 500° C. for 4 hours. After calcination, a thin coating (1-2 um) of Zirconium-based primer (80% Aremco Ceramabond 685-N, 20% $H_2O$ by weight) was applied to the surface of the foil via spray coating. The primer was allowed to set by heating the sample to 250° F. for 4 hours in air. The foil was then held flat and a thin layer of paste was applied to the surface. The paste contained a zeolite, colloidal silica binder, sodium silicate, water, and methyl cellulose polymer. The paste was allowed to briefly set (very slight drying). Then a piece of corrugated SS foil was treated with a release agent (e.g. WD40) and subsequently pressed into the thin layer of paste. The corrugated foil was then removed from the paste, leaving behind the inverse features of the corrugated foil. After air drying, the imprinted structure was then calcined at 400° C. for 4 hours.

Figure 10A:
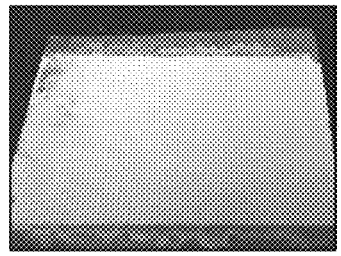
FIGS. 10A, 10B, and 10C provide three images of a coated support, in accordance with an exemplary embodiment of the disclosure.
Figure 10B:
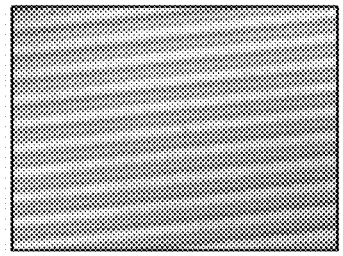
Figure 10C:
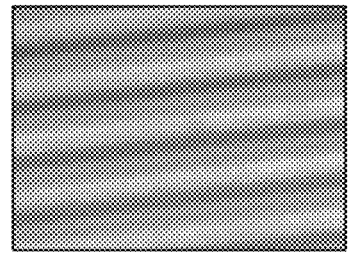
Figure 11A:
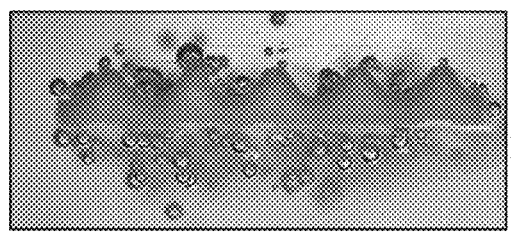
FIGS. 11A and 11B provide images of a cross-sectional view of a coated support, in accordance with an exemplary embodiment of the disclosure.
Figure 11B:
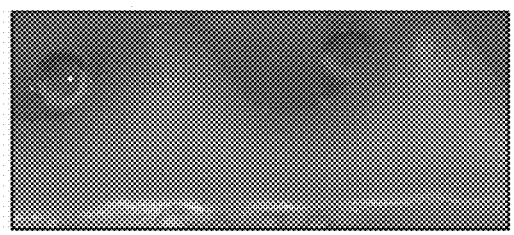

The final layered structure is shown in FIGS. 10A, 10B and 10C. The structure was embedded in a polymer resin to obtain images of the cross-section of the structure, shown in FIGS. 11A and 11B (air bubbles in the image are from the polymer resin used to prepare the cross-sectional image).

Example 2

Figure 12A:
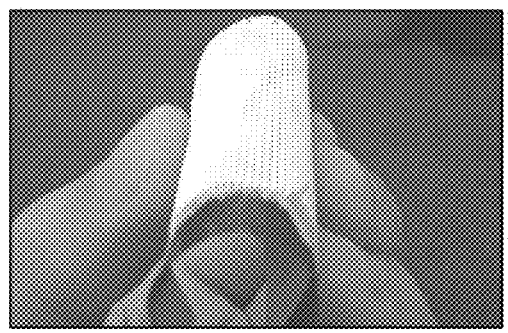
FIGS. 12A and 12B provide images of a coated support, in accordance with an exemplary embodiment of the disclosure.

A coating method is demonstrated. A corrugated SS foil was placed flat on a surface and treated with a release agent (e.g. WD40). Next a piece of oxidized and primed mesh, with same pretreatment as for the flat foil in Example 1, was placed directly on top of the corrugated foil. The paste from Example 1 was pressed through the mesh (similar to silk screening), and the paste filled the corrugations of the underlying foil while simultaneously coating the mesh. Upon drying, the mesh was lifted from the corrugated foil (the "mold"), and the imprinted features remain on the mesh. This integrated ceramic/metal structure can undergo bending to a degree required for rolling into a monolith, FIG. 12A.

Figure 12B:
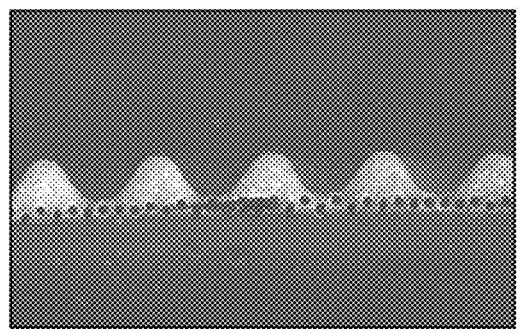

Further, the ceramic is completely integrated into the mesh, and can be seen encasing the mesh when embedded and viewed at the cross-sectional image in FIG. 12B. For purposes of scale, the dots in the cross-sectional image are the mesh wires with a 40 µm diameter.

Example 3

Figure 13:
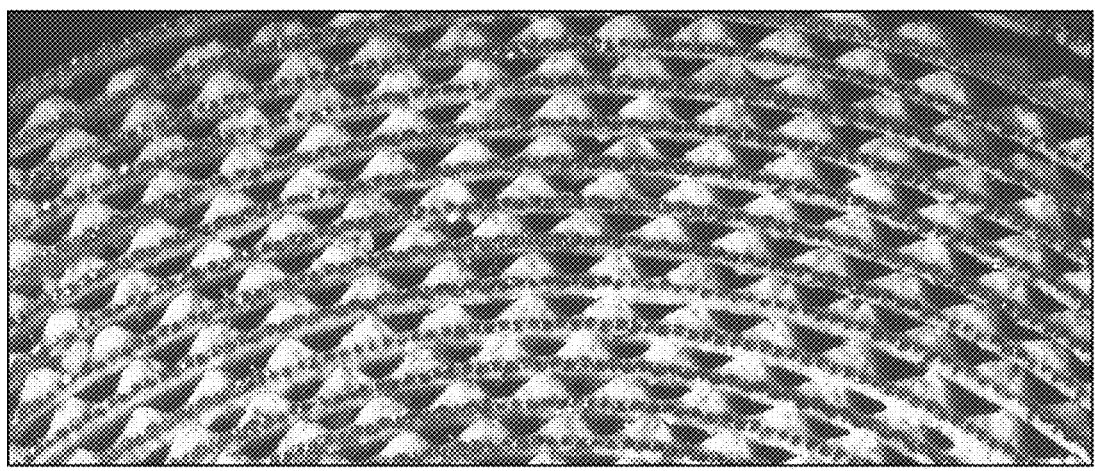
FIG. 13 provides an image of a spiral wound structure, in accordance with an exemplary embodiment of the disclosure.

An example of construction of a structure is demonstrated. A structure from Example 2 was fabricated to dimensions of 6"×60". This was then calcined at 700° C. for 4 hours. The leading edge of the coated foil was tack-welded to an arbor of ½" diameter. This arbor has screw holes in both ends so that it can be assembled into a winding device. The foil and arbor was assembled into the winding device such that the molded features of the substrate were pointing down, and the flat side facing upwards. Tension was applied to keep the substrate taught. The substrate was then saturated with water so the subsequent paste would not dry quickly when applied to the exposed flat side. A thin layer of paste of the same composition from Example 2 was applied to the exposed face of the foil as the foil was wound around the arbor. The resulting structure was then allowed to dry in air for 10 hours and then slowly heated in an oven ramped to 200° F. over 5 hours. Finally, the structure was then calcined at 700° C. for 4 hours. An image of the spiral structure is shown in FIG. 13.

Figure 14:
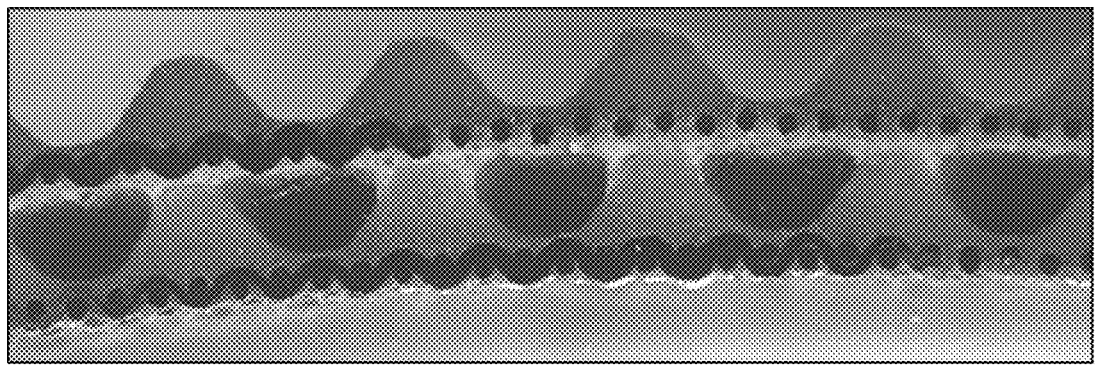
FIG. 14 provides another image of a structure, in accordance with an exemplary embodiment of the disclosure.

FIG. 14 shows an alternate structure where a thin layer of composite can be used to glue together two supports.

EMBODIMENTS

Additionally or alternatively, the disclosure can include one or more of the following embodiments.

Embodiment 1

A structure comprising layered coated supports and passageways between adjacent layered coated supports, wherein each layered coated support comprises a support having a first and second side, and a composite on at least the first side of the support, the composite comprising an active material, and having features in the surface of the composite; and the passageways being formed at the contact of the features in a coating on the first side of a layered structure with a side of an adjacent layered structure. The composite can further comprise a binder.

Embodiment 2

A monolith comprising layered coated supports and channels between adjacent layered coated supports, wherein each layered coated support comprises a support having a first and second side, and a composite on at least the first side of the support, the composite comprising an active material, and having grooves in the surface of the composite; and the channels being formed at the contact of the grooves in a coating on the first side of a layered structure with a side of an adjacent layered structure. The composite can further comprise a binder.

Embodiment 3

A method for preparing a structure or monolith, the method comprising coating, on a support having a first side and a second side, a paste to the first side; creating features in the paste; layering a first coated support with a second coated support by contacting the paste on the first side of the coated support with a side of the second coated support to form enclosed passageways; and calcining the layered supports to form the structure or monolith.

Embodiment 4

The structures, monoliths, or methods of one of the previous embodiments, wherein the support comprises a metal substrate, or the support comprises a sheet, foil or mesh.

Embodiment 5

The structures, monoliths, or methods of one of the previous embodiments, wherein the active material comprises a catalyst or adsorbent, or wherein the active material comprises a zeolite.

Embodiment 6

The structures, monoliths, or methods of one of the previous embodiments, wherein the cell density of the monolith is at least 900 cpsi, or at least 1000 cpsi, or at least 1500 cpsi, or wherein the features are channels, and the distance between channels is less than about 900 microns, or less than about 800 microns, or less than about 700 microns, or less than about 600 microns, or less than about 500 microns.

Embodiment 7

The structures, monoliths, or methods of one of the previous embodiments, wherein the layered coated support comprises a composite or paste on the second side, or wherein the passageways are formed at the contact of the features in the coating on the first side of a coated support with a composite or paste on the second side an adjacent support.

Embodiment 8

The structures, monoliths, or methods of one of the previous embodiments, wherein the layered coated supports comprises separate supports, and the passageways are formed at the contact of the first side of one support with the second side of a separate support.

Embodiment 9

The structures, monoliths, or methods of one of the previous embodiments, wherein the layered coated supports comprises one or more coated supports layered together, coiled in a spiral, and the passageways are formed at the contact of the first side of the coated support with the second side of the coated support.

Embodiment 10

The structures, monoliths, or methods of one of the previous embodiments, wherein a paste layer is coated on the second side of the support, and features are created in the paste on the second side.

Embodiment 11

The structures, monoliths, or methods of one of the previous embodiments, wherein features in the coating or composite can be created by imprinting, stamping, molding, dragging or 3-D printing to form the features in the paste, and subsequent drying and/or calcining to produce the features in the composite.

Embodiment 12

The structures, monoliths, or methods of one of the previous embodiments, wherein the composite has tortuous pathways through the composite for fluid communication of the adsorbent with the passageways. The composite can have a mesoporosity of at least about 10%, at least about 15%, or at least about 20%, and up to about 90%, up to about 85%, or up to about 80%.

Embodiment 13

The structures, monoliths, or methods of one of the previous embodiments, wherein the active material is enclosed within the composite at at least about 5%, at least about 10%, at least about 15%, or at least about 20%.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

We claim:

1. A method for preparing a structure, the method comprising;
   coating, on a support having a first side and a second side, a paste to the first side;
   creating features in the paste;
   layering a first coated support with a second coated support by contacting the paste on the first side of the first coated support with a side of the second coated support to form enclosed passageways; and
   calcining the layered supports to form the structure.

2. The method of claim 1, wherein the paste comprises an active material.

3. The method of claim 2, wherein the paste further comprises a binder.

4. The method of claim 1, wherein the side of the second coated support is a second side of the second coated support which coated with a thin layer of paste, and the enclosed passageways are formed by the contact of the paste with features of the first coated support to the thin layer of paste on the second side of the second coated support.

5. The method of claim 1, wherein the features are created by imprinting, stamping, molding, dragging, or 3-D printing.

6. The method of claim 1, wherein a paste layer is coated on the second side of the first coated support, and features are created in the paste on the second side of the first coated support.

7. The method of claim 1, wherein the layering step comprises layering the first coated support onto a separate coated support to form layers of coated supports.

8. The method of claim 1, wherein the layering step comprises a single coated support coiled in a spiral such that the first side of the support can contact the second side of the support to form the enclosed passageways within a spiral structure.

9. The method of claim 1, wherein the support comprises a metal substrate.

10. The method of claim 1, where the support comprises a sheet, foil or mesh.

11. The method of claim 2, wherein the active material comprises a zeolite.

12. The method of claim 2, wherein the active material comprises a catalyst or adsorbent.

13. The method of claim 12, wherein at least 10% of the active material is enclosed by the paste.

14. The method of claim 1, wherein the structure is a monolith.

15. The method of claim 14, wherein the cell density of the monolith is at least 900 cpsi.

16. The method of claim 1, wherein the features are channels, and the distance between channels is less than about 900 microns.

17. The method of claim 1, further comprising tortuous pathways through the paste for fluid communication of the adsorbent with the passageways.

18. The method of claim 17, wherein the paste has a mesoporosity of at least about 15%.

19. The method of claim 1, wherein the passageways are formed at the contact of the features in the paste on the first side of the first coated support with the side of the second coated support are formed solely by the features in the surface of the paste of the first coated support, or additionally by features in a surface of a paste that is located on the side of the second coated support.

20. The method of claim 3, wherein the passageways are formed at the contact of the features in the paste on the first side of the first coated support with the side of the second coated support are formed solely by the features in the surface of the paste of the first coated support, or additionally by features in a surface of a paste that is located on the side of the second coated support.

* * * * *